Figure 1:
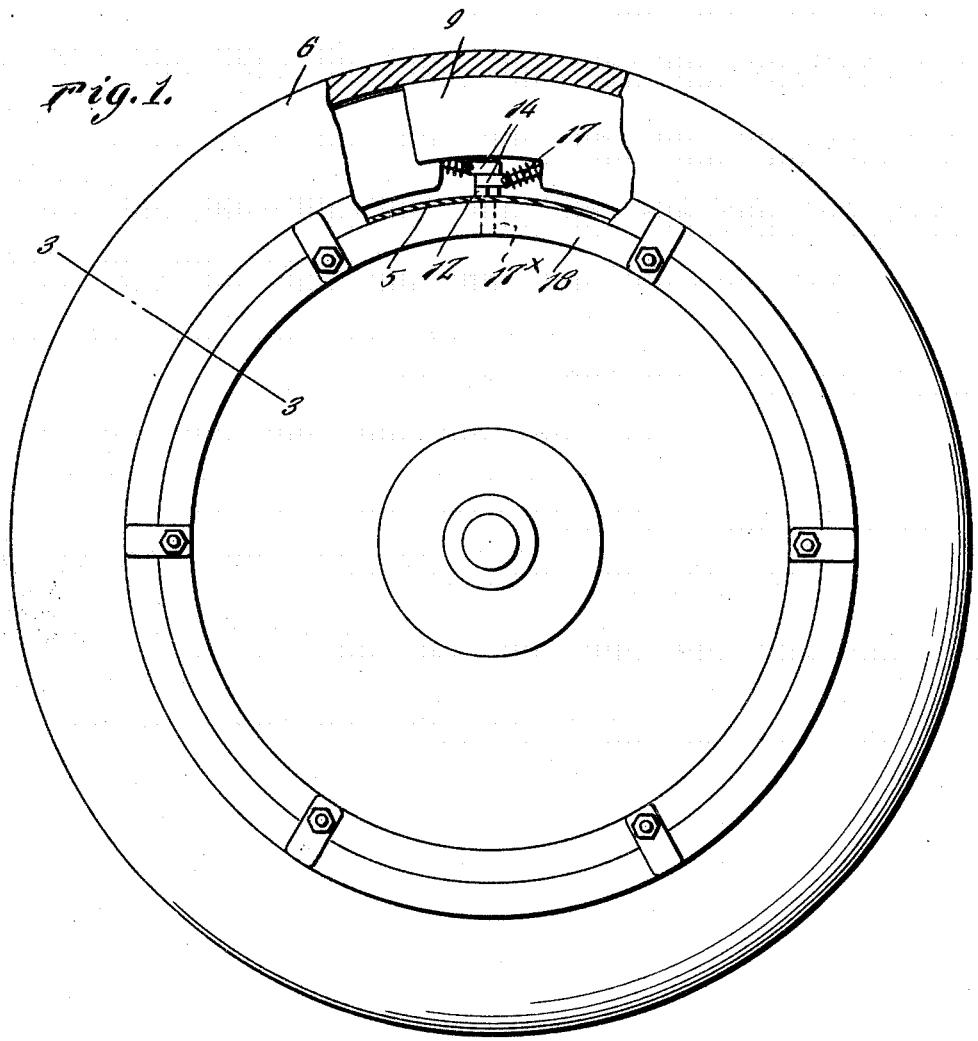

Oct. 22, 1929.  F. TOBIN  1,732,668
TIRE SHOE EXPANDER
Filed March 7, 1929   2 Sheets-Sheet 1

Inventor
Frank Tobin

By Clarence A. O'Brien
Attorney

Oct. 22, 1929.   F. TOBIN   1,732,668
TIRE SHOE EXPANDER
Filed March 7, 1929   2 Sheets-Sheet 2
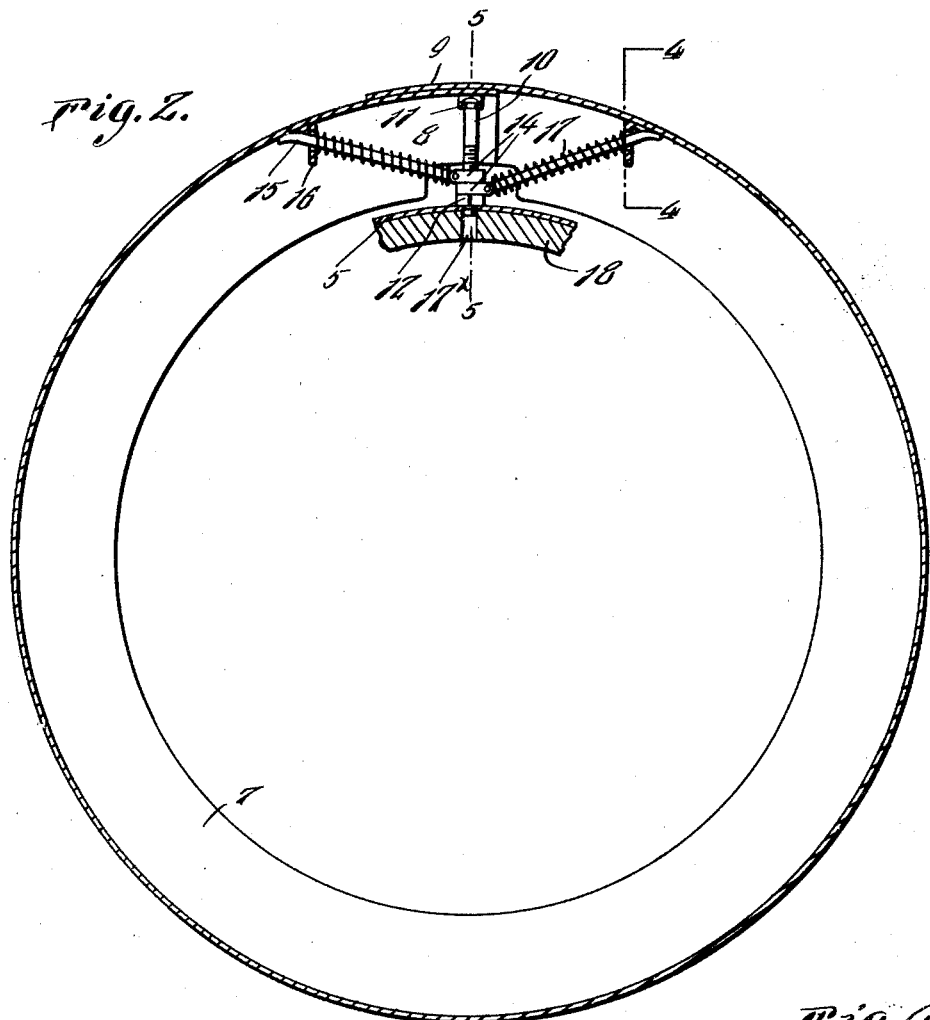
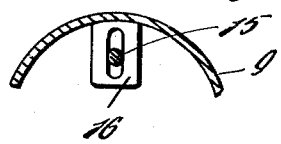
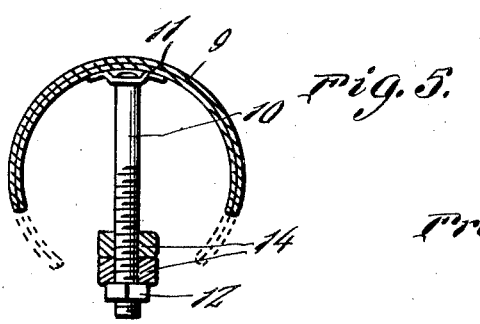
Inventor
Frank Tobin
By Clarence A. O'Brien
Attorney Patented Oct. 22, 1929

1,732,668

UNITED STATES PATENT OFFICE

FRANK TOBIN, OF HELENA, MONTANA

TIRE-SHOE EXPANDER

Application filed March 7, 1929. Serial No. 345,107.

The present invention relates to a tire shoe expander i. e., a device for taking the place of pneumatic inner tubes for tire shoes and has for its prime object to provide a split resilient band which may be placed inside the tire shoe and expanded the desired amount.

Another very important object of the invention resides in the provision of a device of this nature which is simple in its construction, inexpensive to manufacture, easy to adjust, strong and durable, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 3:
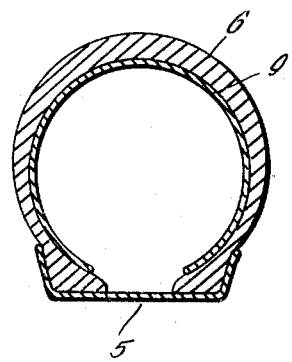

In the drawing:

Figure 1 is a side view of a tire shoe with a portion in section showing parts of my improvement, Figure 2 is a sectional view through my device, Figure 3 is a section taken on line 3—3 of Figure 1, Figure 4 is a section taken on line 4—4 of Figure 2, and Figure 5 is a section taken on line 5—5 of Figure 2.

Referring to the drawings in detail, it will be seen that the numeral 7 denotes a split band arcuate in cross section and having overlapping ends 8 and 9 which are slightly reduced in width, the end 8 being inside the end 9. A bolt 10 is secured by means of a plate 11 in the end 8 to extend inwardly and is threaded to receive a nut 12.

A pair of collars 14 are slidable on the bolt and have pivotally connected thereto rods 15 which pass through slots in ears 16 extending inwardly from the band 7 adjacent the ends thereof. Springs 17 are disposed about the rods and impinge against the collars 14 and the ears 16.

Obviously by securing the nuts 12 on the bolt, the collars 14 are moved so as to increase the compression of the springs 17 thus tending to expand the band 7 inside the tire shoe 6 and thus the proper pressure may be obtained. When the wheel is in use it will be seen that flexing of the tire shoe will be allowed to a certain extent causing a contraction of the band 7 against the action of the springs 17 whereby the desired resiliency in the tire assembly is attained.

The bolt 10 has its inner end extending through the usual opening 17× for the tire valve in the wheel felly 18 and of course the corresponding opening is provided in the rim 5. This band 7 is preferably constructed of resilient sheet metal, tin or equivalent material.

It is thought that the construction, operation, utility and advantages of this invention will now be quite apparent to those skilled in this art without a more detailed description thereof. The present embodiment of the invention has been described in detail, merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described comprising a split band of resilient sheet material, said band being arcuate in cross section and having its ends in overlapping relationship, a bolt attached to the inner end of the split band and extending inwardly therefrom and threaded, a nut on the bolt, collars on the bolt, rods pivotally engaged with the collars and extending in opposite directions, ears extending inwardly from the split band adjacent the ends thereof and having slots to receive the rods, and springs about the rods impinging against the ears and the collars.

2. A device of the class described comprising a split band of resilient sheet material, said band being arcuate in cross section and having its ends in overlapping relationship, a bolt attached to the inner end of the split band and extending inwardly therefrom and threaded, a nut on the bolt, collars on the bolt, rods pivotally engaged with the collars and extending in opposite directions, ears extending inwardly from the split band adjacent the ends thereof and having slots to receive the rods, and springs about the rods impinging against the ears and the collars, said ends of the band being reduced in width to provide space for affording access to the nut, whereby it may be screwed on to the bolt to increase the compression of the spring.

In testimony whereof I affix my signature.

FRANK TOBIN.